(12) United States Patent
Hardie

(10) Patent No.: US 7,793,744 B1
(45) Date of Patent: Sep. 14, 2010

(54) CART APPARATUS

(76) Inventor: Frank D. Hardie, 1163 Miller La., Lakeshore, MN (US) 56468

( * ) Notice: Subject to any disclaimer, the term of this patent is extended or adjusted under 35 U.S.C. 154(b) by 216 days.

(21) Appl. No.: 12/117,082

(22) Filed: May 8, 2008

(51) Int. Cl.
*B62B 1/00* (2006.01)
*B62D 51/04* (2006.01)

(52) U.S. Cl. .................... 180/19.1; 180/19.3; 280/40; 280/640; 280/652

(58) Field of Classification Search ............... 180/19.1, 180/19.2, 19.3; 280/40, 63, 639, 640, 652
See application file for complete search history.

(56) References Cited

U.S. PATENT DOCUMENTS

| | | | |
|---|---|---|---|
| 2,869,661 A | 1/1959 | Fernandez | |
| 2,925,134 A | 2/1960 | Cunningham, Jr. | |
| 2,992,834 A * | 7/1961 | Tidwell et al. | 280/47.3 |
| 3,205,963 A | 9/1965 | Tinker | |
| 3,797,446 A | 3/1974 | Cox et al. | |
| 4,669,561 A | 6/1987 | Sheen | |
| 4,811,988 A * | 3/1989 | Immel | 298/2 |
| 5,064,012 A * | 11/1991 | Losego | 180/19.1 |
| D333,370 S | 2/1993 | Monk | |
| 5,284,218 A * | 2/1994 | Rusher, Jr. | 180/19.1 |
| 5,295,556 A | 3/1994 | Mullin | |
| 5,330,212 A * | 7/1994 | Gardner | 280/40 |
| 5,839,528 A | 11/1998 | Lee | |
| 5,873,582 A | 2/1999 | Kauffman, Jr. et al. | |
| 6,129,166 A * | 10/2000 | Sueshige et al. | 180/65.6 |
| 6,260,864 B1 * | 7/2001 | Smith | 280/47.26 |
| 6,283,496 B1 * | 9/2001 | Dickmann | 280/652 |
| 6,341,787 B1 * | 1/2002 | Mason | 280/47.26 |
| 6,793,236 B1 * | 9/2004 | Mitchell | 280/652 |
| 7,017,939 B2 * | 3/2006 | Darling, III | 280/652 |
| 2003/0080538 A1 | 5/2003 | Watts et al. | |
| 2004/0084864 A1 * | 5/2004 | Casey et al. | 280/47.31 |

\* cited by examiner

*Primary Examiner*—Lesley Morris
*Assistant Examiner*—Marc A Scharich

(57) ABSTRACT

A cart apparatus includes a frame for receiving game. The frame includes a pair of side supports and a plurality of lateral supports that are attached to and extend between the side supports. A netting material is attached to the frame and extends between the side supports. An axle is rotatably coupled to the frame. The axle extends between the side supports and has a pair of opposite ends. A pair of wheels is attached to the axle. Each of the wheels is positioned adjacent to one of the opposite ends. A motor is mounted to the frame. A drive shaft is mechanically coupled to the motor and to the axle. The motor rotates the wheels when the drive shaft is engaged.

7 Claims, 9 Drawing Sheets

CART APPARATUS

BACKGROUND OF THE INVENTION

Field of the Invention

The present invention relates to cart devices and more particularly pertains to a new cart device for assisting a hunter in transporting game.

SUMMARY OF THE INVENTION

The present invention meets the objectives presented above by generally comprising a frame for receiving game. The frame includes a pair of side supports and a plurality of lateral supports that are attached to and extend between the side supports. A netting material is attached to the frame and extends between the side supports. An axle is rotatably coupled to the frame. The axle extends between the side supports and has a pair of opposite ends. A pair of wheels is attached to the axle. Each of the wheels is positioned adjacent to one of the opposite ends. A motor is mounted to the frame. A drive shaft is mechanically coupled to the motor and to the axle. The motor rotates the wheels when the drive shaft is engaged.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
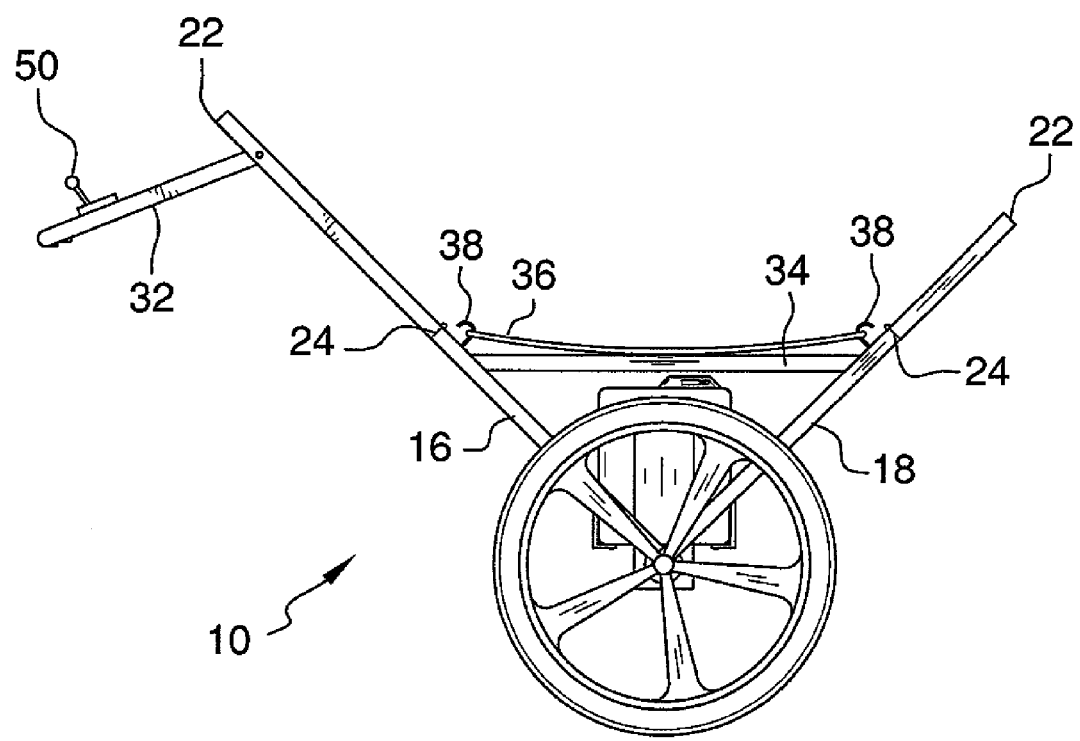
FIG. 1 is a side view of a cart apparatus according to the present invention.
Figure 2:
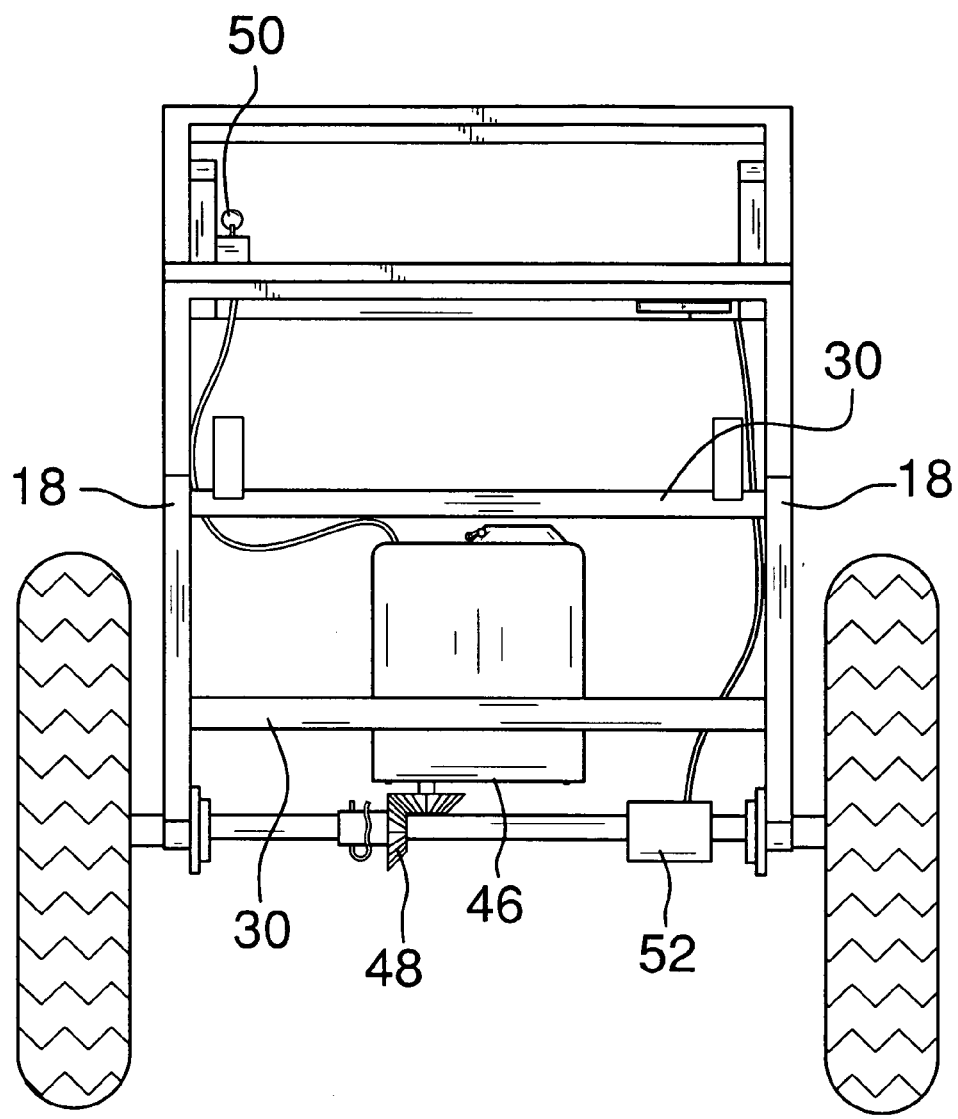
FIG. 2 is a front view of the present invention.
Figure 3:
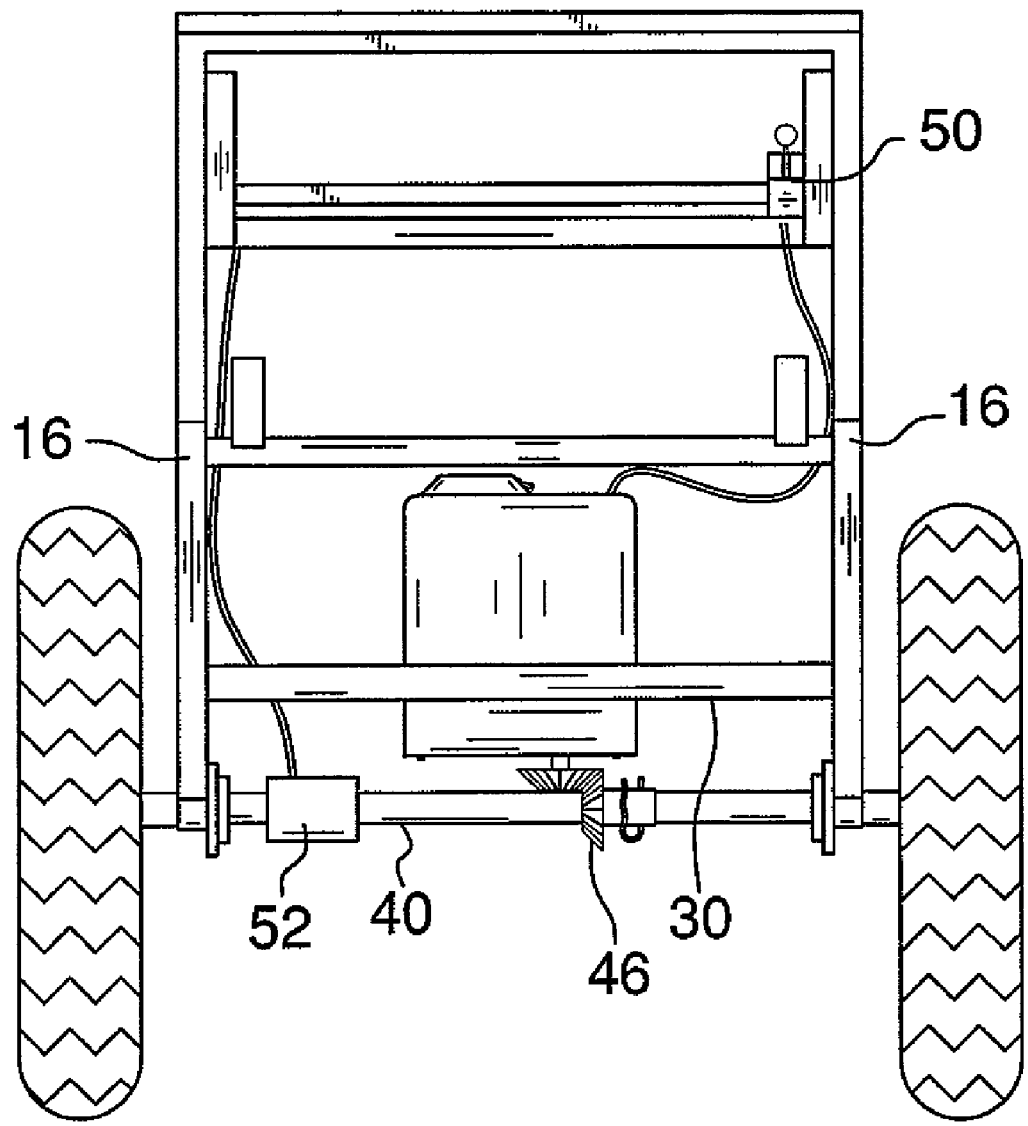
FIG. 3 is a rear view of the present invention.
Figure 4:
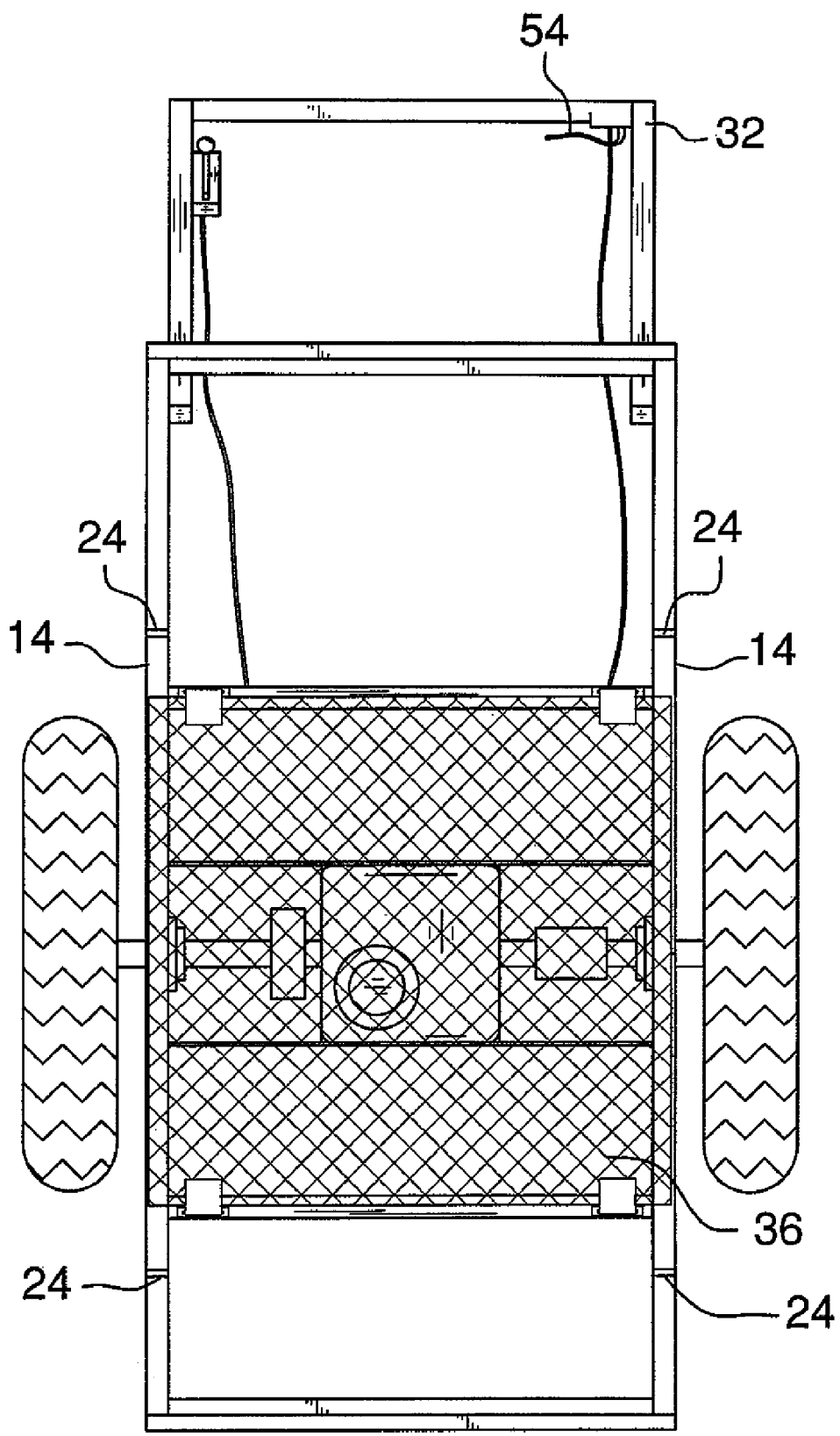
FIG. 4 is a top view of the present invention.
Figure 5:
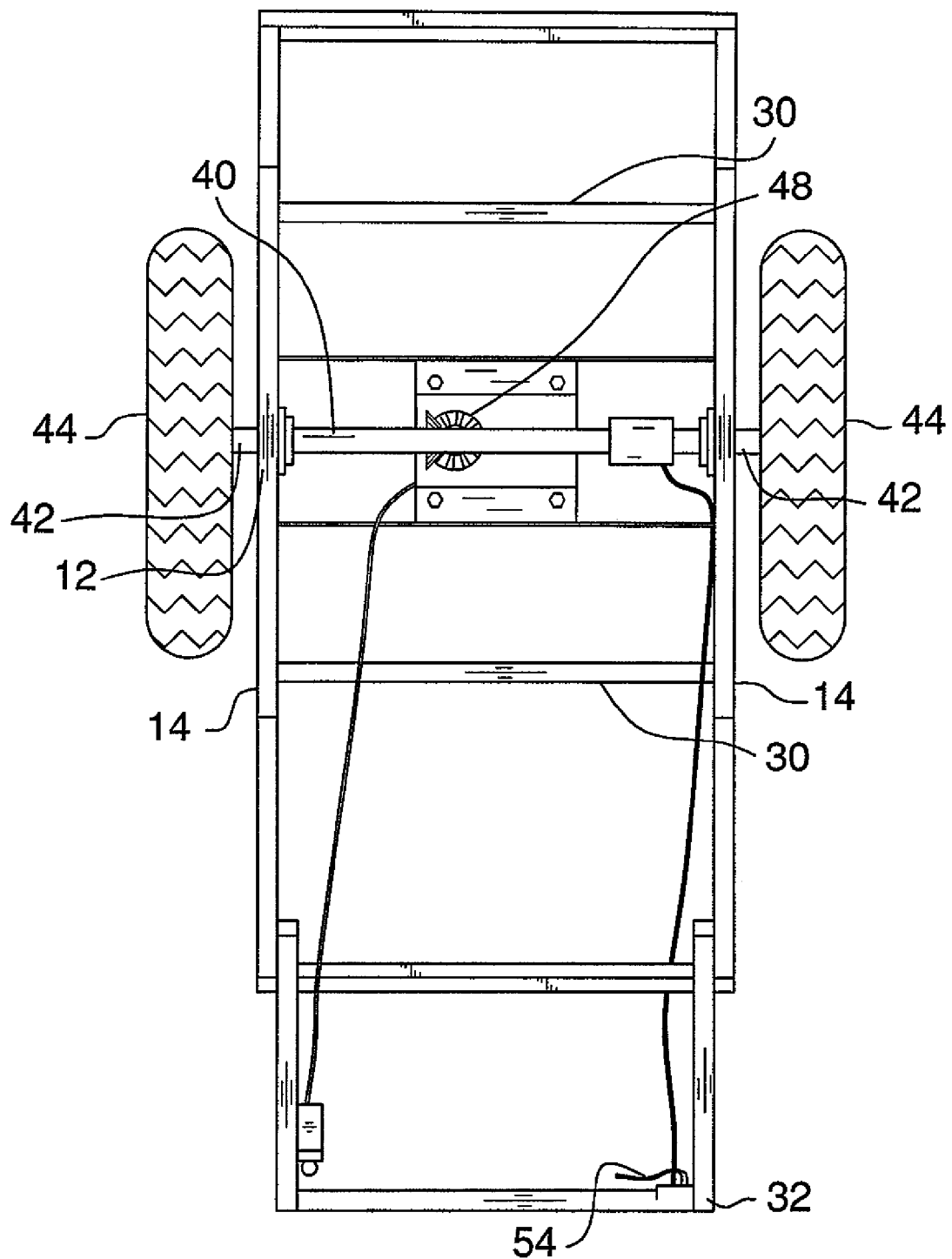
FIG. 5 is a bottom view of the present invention.
Figure 6:
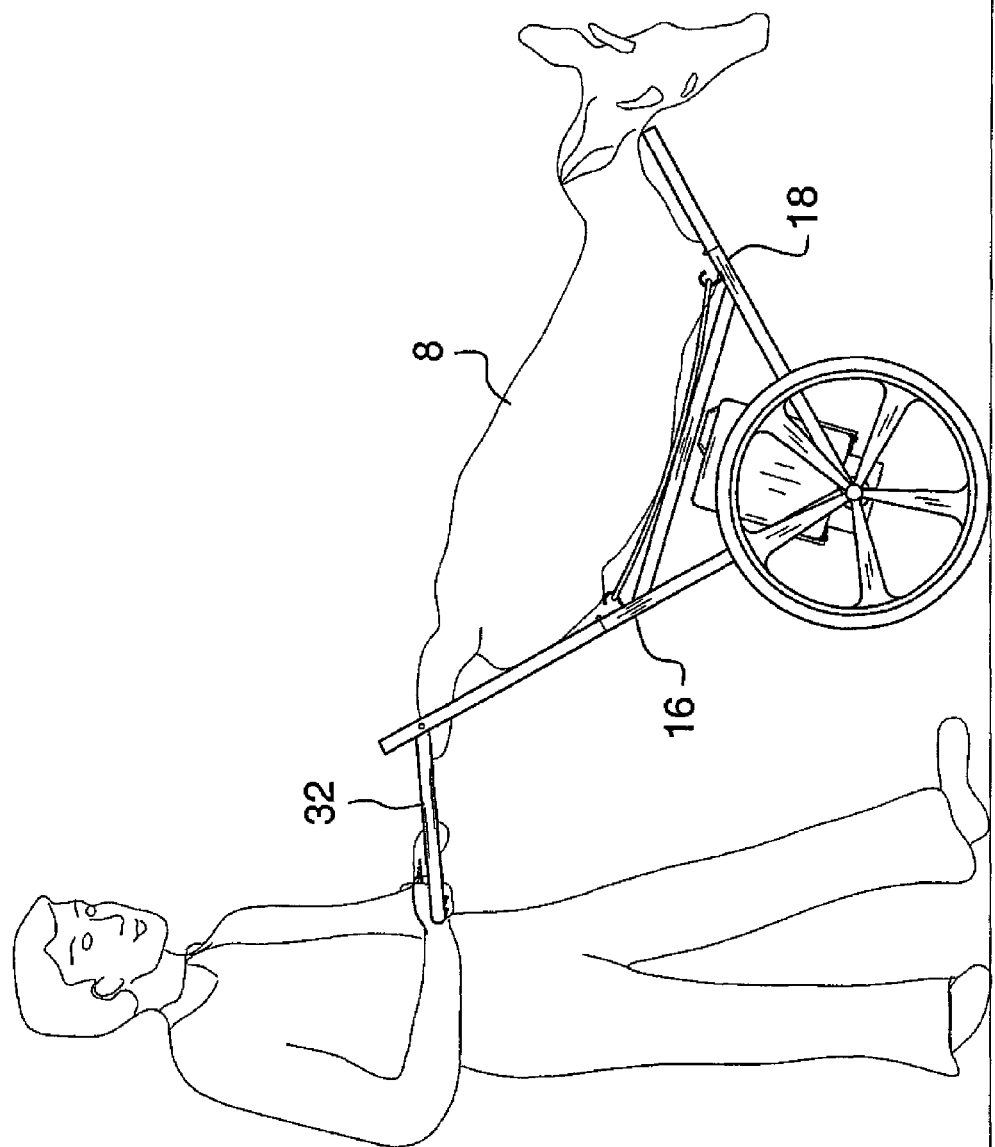
FIG. 6 is a side in-use view of the present invention.

With reference now to the drawings, and in particular to FIGS. 1 through 9 thereof, a new cart device embodying the principles and concepts of the present invention and generally designated by the reference numeral 10 will be described.

As best illustrated in FIGS. 1 through 9, the cart apparatus 10 generally comprises a frame 12 for receiving game 8, such as deer, acquired during hunting. The frame 12 includes a pair of side supports 14. Each of the side supports 14 includes a first leg 16 and a second leg 18 each having a first end 20 and a second end 22. The first ends 20 are attached together and an angle between the first 16 and second 18 legs is between 40 degrees and 70 degrees so that the first 20 and second 22 ends extend upwardly from a ground surface when the frame 12 is being used to transport game 8. Each of the first 16 and second 18 legs has a break 24 therein to define a first 26 and second 28 portion of each of the first 16 and second 18 legs. Each of the first portions 26 is hingedly coupled to a corresponding one of the second 28 portions. The first portions 26 are foldable into a stored position to allow the frame 12 to be more easily transported and stored when not in use. The first legs 16 have a longer length than the second legs 18.

Figure 7:
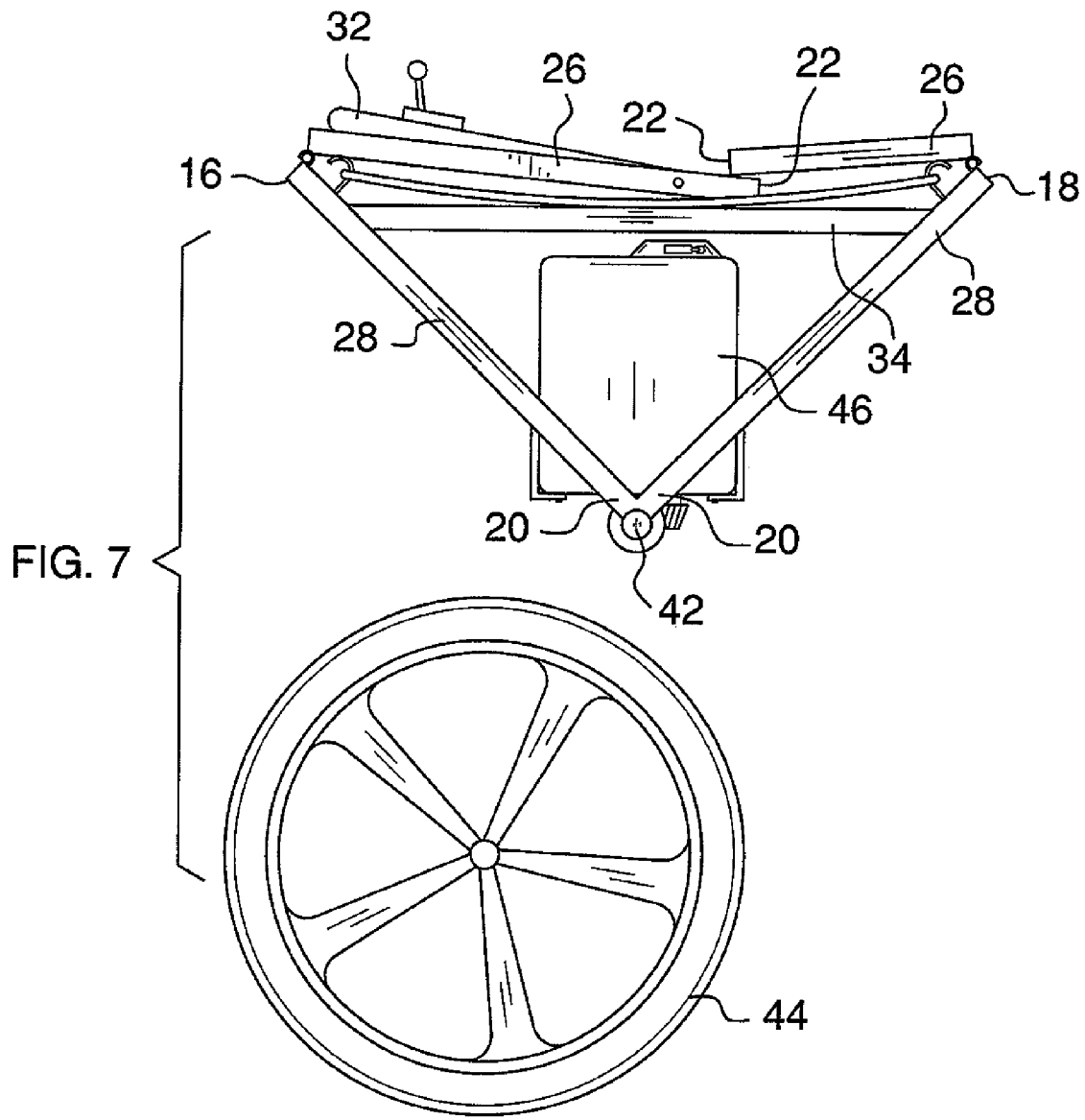
FIG. 7 is a side view of the present invention in a collapsed position.

The frame 12 further includes a plurality of lateral supports 30 that are attached to and extend between the side supports 14. The frame 12 includes a handle 32 that is attached to and extends between the side supports 14. The handle 32 is positioned adjacent to the second ends 22 of the first arms 16. The handle 32 may be pivotally coupled to the side supports 14 to allow the handle 32 to be folded into a stored position as shown in FIG. 7. A pair of braces 34 is provided. Each of the braces 34 is attached to and extends between an attached pair of the first 16 and second 18 legs.

A netting material 36 is attached to the frame 12 and extends between the side supports 14. The netting material 36 may be attached to the frame 12 by hooks 38 mounted on the first 16 and second 18 legs or on the lateral supports 30. The hooks 38 allow the netting material 36 to be removed when the apparatus 10 is not being used. The netting material 36 receives the game 8 and supports it on the frame 12.

Figure 8:
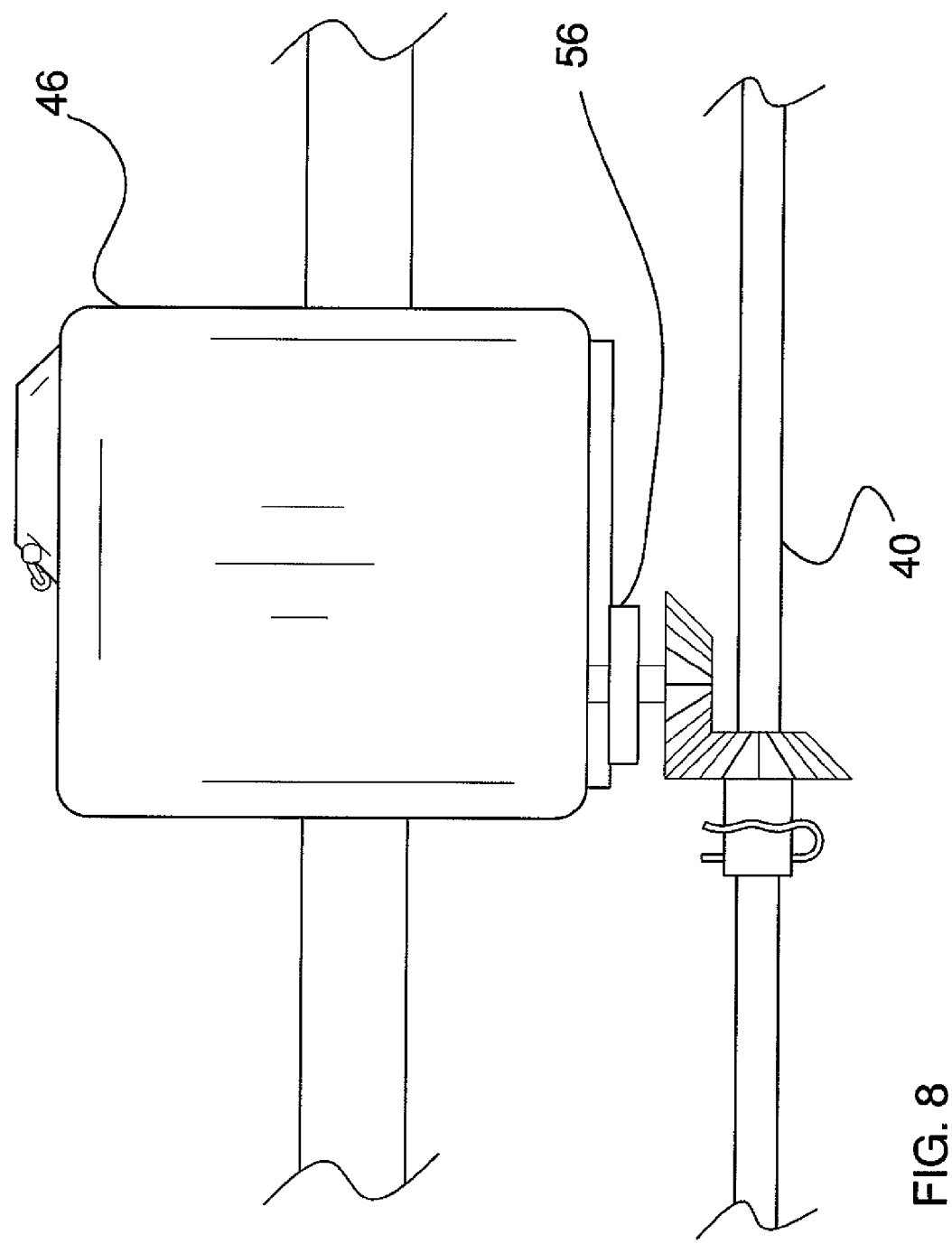
FIG. 8 is a front enlarged view of a drive system of the present invention.
Figure 9:
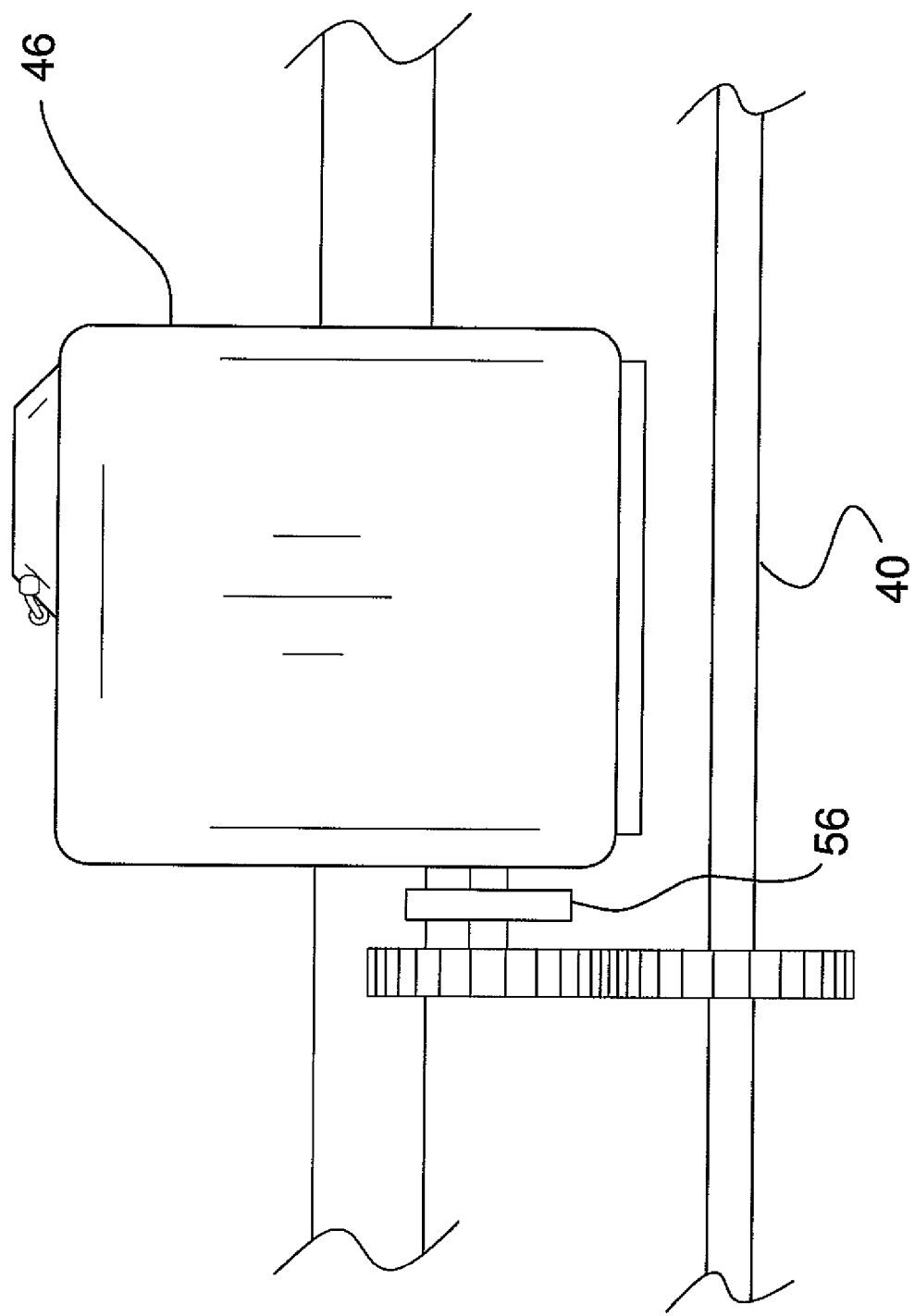
FIG. 9 is a front enlarged view of a second embodiment of a drive system of the present invention in a collapsed position.

An axle 40 is rotatably coupled to the frame 12. The axle 40 extends between the side supports 14 and has a pair of opposite ends 42. The axle 40 is positioned at a juncture of the first 16 and second 18 legs of each of the side supports 14. A pair of wheels 44 is attached to the axle. Each of the wheels 44 is positioned adjacent to one of the opposite ends 42. A motor 46 is mounted to the frame 12 and a drive shaft 48 is mechanically coupled to the motor 46 and to the axle 40. The motor 46 rotates the wheels 44 when the drive shaft 48 is engaged. An actuator 50 for actuating the drive shaft 48 is mounted on the handle 32 and mechanically coupled to the motor 46. Apparatus 10 may use a conventional centrifugal clutch assembly 56 which engages the motor 46 with the axle 40 when the motor 46 attains sufficient rpm. The motor 46 may be an electric motor or a gas powered motor. The actuator 50 controls fuel flow or electrical power being supplied to the motor 46 which in turns increases the speed of the centrifugal clutch 56 to cause it to engage the axle 40. The motor 46, actuator 50 and drive shaft 48 are conventional in nature and may include both reverse and forward drive options. A brake assembly 52 is mechanically coupled to the axle 40. The brake assembly 52 restricts rotation of the axle 40 when the brake assembly 52 is actuated by its grip 54. FIG. 8 depicts a version which is gear driven where as FIG. 9 utilizes a chain and sprocket wheels.

In use, the apparatus 10 is retained in a stored, folded position until needed as seen in FIG. 7. The wheels 44 are removably coupled to the axle 40 to allow them to be removed when the apparatus 10 is being stored. When needed, the first 16 and second 18 arms are extended and the netting 36 positioned on the frame 12. The game 8 is then positioned on the netting 36 and the motor 46 used to rotate the wheels 44 and transport the game 8 where needed.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cart apparatus receiving and transporting game, said apparatus comprising:
   a frame for receiving the game, said frame including a pair of side supports and a plurality of lateral supports being attached to and extending between said side supports;
   a netting material being attached to said frame and extending between said side supports;
   an axle being rotatably coupled to said frame, said axle extending between said side supports, said axle having a pair of opposite ends;
   a pair of wheels each being attached to said axle, each of said wheels being positioned adjacent to one of said opposite ends; and
   a motor being mounted to said frame, a drive shaft being mechanically coupled to said motor and to said axle, said motor rotating said wheels when said drive shaft is engaged;
   each of said side supports including a first leg and a second leg each having a first end and a second end, said first ends being attached together, an angle between said first and second legs being between 40 degrees and 70 degrees and said first and second ends extending upwardly from a ground surface when said frame is being used to transport game; and
   each of said first and second legs having a break therein to define a first and second portion of each of said first and second legs, each of said first portions being hingedly coupled to a corresponding one of said second portions, said first portions being foldable into a stored position.

2. The apparatus according to claim 1, wherein said frame includes a handle being attached to and extending between said side support.

3. The apparatus according to claim 2, further including an actuator for actuating said drive shaft, said actuator being mounted on said handle and mechanically coupled to said motor.

4. The apparatus according to claim 1, wherein said first leg of each of said side supports has a longer length than an attached one of said second legs.

5. The apparatus according to claim 1, wherein said frame includes a pair of braces, each of said braces being attached to and extending between an attached pair of said first and second legs.

6. The apparatus according to claim 1, further including a brake assembly being mechanically coupled to said axle, said brake assembly restricting rotation of said axle when said brake assembly is actuated.

7. A cart apparatus receiving and transporting game, said apparatus comprising:
   a frame for receiving the game, said frame including a pair of side supports, each of said side supports including;
      a first leg and a second leg each having a first end and a second end, said first ends being attached together, an angle between said first and second legs being between 40 degrees and 70 degrees and said first and second ends extending upwardly from a ground surface when said frame is being used to transport game, each of said first and second legs having a break therein to define a first and second portion of each of said first and second legs, each of said first portions being hingedly coupled to a corresponding one of said second portions, said first portions being foldable into a stored position, each of said first legs having a longer length than each of said second legs;
   said frame including a plurality of lateral supports being attached to and extending between said side supports;
   said frame including a handle being attached to and extending between said side supports, said handle being positioned adjacent to said second ends of said first legs;
   said frame including a pair of braces, each of said braces being attached to and extending between an attached pair of said first and second legs;
   a netting material being attached to said frame and extending between said side supports;
   an axle being rotatably coupled to said frame, said axle extending between said side supports, said axle having a pair of opposite ends, said axle being positioned at a juncture of said first and second legs of each of said side supports;
   a pair of wheels each being attached to said axle, each of said wheels being positioned adjacent to one of said opposite ends;
   a motor being mounted to said frame, a drive shaft being mechanically coupled to said motor and to said axle, said motor rotating said wheels when said drive shaft is engaged;
   an actuator for actuating said drive shaft being mounted on said handle and mechanically coupled to said motor; and
   a brake assembly being mechanically coupled to said axle, said brake assembly restricting rotation of said axle when said brake assembly is actuated.

* * * * *